INVENTORS
EDWIN B. NOLT
JOHN H. EBERLY
& RICHARD R. EBY

INVENTORS
EDWIN B. NOLT
JOHN H. EBERLY
& RICHARD R. EBY

Dec. 17, 1968  E. B. NOLT ET AL  3,416,824
GUIDE FOR KNOTTER NEEDLE OF BALER
Filed Aug. 16, 1967  3 Sheets-Sheet 3

INVENTORS
EDWIN B. NOLT
JOHN H. EBERLY
& RICHARD R. EBY
BY

United States Patent Office 3,416,824
Patented Dec. 17, 1968

3,416,824
GUIDE FOR KNOTTER NEEDLE OF BALER
Edwin B. Nolt, New Holland, John H. Eberly, Lancaster, and Richard R. Eby, Ephrata, Pa., assignors to Sperry Rand Corporation, New Holland, Pa., a corporation of Delaware
Filed Aug. 16, 1967, Ser. No. 661,016
7 Claims. (Cl. 289—2)

ABSTRACT OF THE DISCLOSURE

Twine knotter mechanism for a baler utilizing twine to tie bales into compressed, completed condition and including a knotter unit and a clamping unit arranged in close operative positions upon the case of a baler, an arcuate needle supported in cantilever manner upon a yoke for swinging movement of the outer end thereof from a retracted to an extended operative position adjacent said knotter to carry an elongated loop of twine thereto for tying one side of said loop to the clamped outer end of said strand, and means to actuate said units and needle in timed relationship relative to each other, in combination with guide means fixed relative to said baler case and positioned for slidable interengagement with opposed surfaces of said needle adjacent said knotter unit to insure accurate positioning of the outer end of the needle and elongated loop of twine carried thereby for positive engagement with said knotter unit and thereby insure the tying of a satisfactory knot each time the mechanism functions.

Background of the invention

Balers for baling hay and the like comprise a case which defines the shape of the bale as it is formed. Said case is of a portable nature and as the baler moves across a field, it is subjected to jolting and jostling in accordance with the nature of the terrain. Fixedly supported by the top wall of the case is a knotter unit having an adjacent clamping unit for each strand of twine to be tied around each bale as formed.

The customary manner of arranging a strand of twine around the bale is to clamp the leading end of such strand of twine by the clamping unit. As the compressed hay or the like is moved forwardly in the case, the strand of twine is also progressively pushed forward by the bale as it is formed so that the strand extends along the top of the bale, down the forward end, and beneath the lower surface of the bale and from there the twine extends through an eye in the outer end of a cantilever-type curved needle mounted adjacent the lower wall of the case of the baler upon a transverse shaft.

The aforementioned needles, in actual practice, are at least several feet long and it can be appreciated that since they are only conneceptd at one end to a transverse supporting bar which, in turn, is mounted upon a pair of pivoted arms respectively adjacent opposite sides of the baler case, there is an appreciable tendency for the outer end of such needle to wobble a limited extent, especially if the baler moves over relatively rough terrain.

When the bale has been formed to the desired extent and the time arrives for the strands of twine to be tied around the completed bale, the needle assembly is moved arcuately to project the outer ends of the needles upwardly through the case of the baler and into the region of the knotter and clamping units in order to carry an elongated loop of twine particularly into association with the knotter unit for each of the strands of the twine in order that one side of said loop may be tied into a knot with the free end of the strand which meanwhile has been clamped by the clamping unit.

Tying a knot of the type referred to occurs very quickly, actually in less than one second of time, whereby the arcuate movement of the curved needles likewise is of a very rapid nature. Under such circumstances, it can be appreciated that there is a distinct tendency to normally somewhat variably move the outer end of each needle at least slightly from its desired, intended path adjacent the knotter unit. If such deviation in movement of the outer end of the needle is of any appreciable amount, the knotter mechanism might malfunction and not form the required knot.

Summary of the invention

The principal object of the present invention is to provide guide means preferably of a stationary nature and mounted adjacent the knotter unit supported by the top wall of the case of a baler. Such guide means preferably comprise a pair of transversely spaced surfaces which are positioned respectively to be engaged by one or the other of the sides of the aforementioned curved needles particularly during the uppermost portion of the path of travel thereof to insure operative positioning of the elongated loop of twine carried thereby in position to engage the knotter unit in a manner to insure that a knot will be tied and no malfunctioning of the knotter unit will occur.

In the preferred construction of the guide means, utilization is made of a surface of the knotter frame casting which supports the knotter and clamping units to provide a guide surface engageable with one side of the arcuate needle, while a bail member which is also fixed appropriately to said knotter frame casting is positioned so that one leg thereof comprises a guide surface engageable by the opposite side of the curved needle.

In addition to accurately positioning the outer end portion of the curved needle during the uppermost portion of its path of movement adjacent the knotter unit, said guide means also are provided with a suitably sloping surface which is engageable by one side of the elongated loop of twine which is carried upward by the arcuate needle, said side of such loop of twine comprising that which is engaged by the knotter unit and of which one side of said loop is to be tied to the clamped end of the strand of twine in a knot of suitable type formed by the knotter unit, thus insuring that said side of said elongated loop of twine is received positively and accurately by the knotter unit for such purpose.

Description of the preferred embodiments

Figure 1:
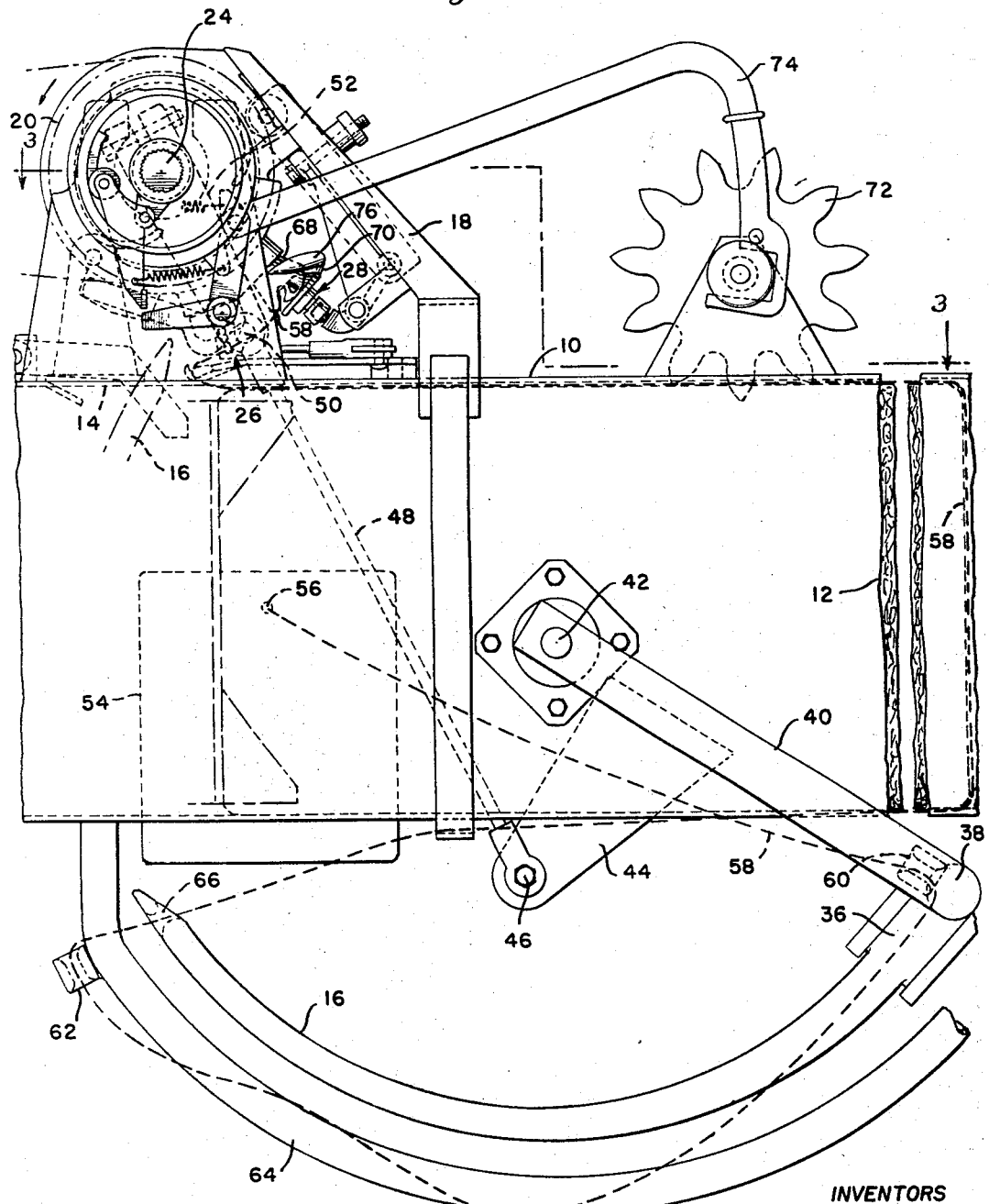
FIG. 1 is a fragmentary side elevation of the bale case portion of the baler upon which a knotter assembly is mounted for cooperative relation with an arcuate needle which is illustrated in its inoperative position in full lines, and, in phantom, the outer end of said needle is shown fragmentarily in its nearly fully elevated position adjacent the knotter assembly.

Referring to FIG. 1, a substantially horizontally extending case 10 of a baler is shown, fragmentarily, the same being generally rectangular in cross-section. In this view, the case has been broken to foreshorten the same and within the broken portion, fragmentary portions of a hay bale 12 are shown. Adjacent the left hand end of the portion of the case 10 shown in FIG. 1, a slot 14 is illustrated in the top wall thereof. Preferably, a plurality of transversely spaced slots 14 are formed therein respectively to accommodate arcuate needles 16, details of which are described hereinafter.

Fixed to a bracket on the upper surface of case 10 is a rigid arm 18 to which a knotter frame casting 20 is rigidly connected, such as by bolts 22. A drive shaft 24 extends through suitable bearings in the casting 20 for purposes of driving the knotter unit 26 and clamping unit 28 which are shown in side elevation in FIG. 2. One such casting and associated mechanism is provided for each needle 16. The frame casting 20 also is provided with a radial boss 30 which is provided with a pair of radially extending bearing openings 32 and 34 through which shafts, not shown in detail, respectively project and comprise parts of the knotter and clamping units 26 and 28 to support and rotate certain movable elements thereof, details of which are not essential to the present invention, other than to state that such shafts are actuated by the drive shaft 24 through mechanism, not illustrated herein.

The needle 16, in actual practice, is of the order of approximately two ft. or more in length. The base end 36 of the needle, as shown in FIG. 1, is connected to a transverse bar or rod 38 of a yoke, the opposite ends of which respectively are fixed to the outer ends of arms 40 which, at the other ends thereof, are connected to pintles 42 respectively projecting from opposite sides of the case 10. One of the arms 40 is provided with a laterally extending ear 44 and the outer end thereof is connected by a pivot bolt 46 to one of a connecting link 48. The opposite end of link 48 is connected by a crank pin 50 to the outer end of a crank arm 52 which is connected at its other end to drive shaft 24 for rotation thereby incident to the tying of a plurality of strands of twine around a completed bale.

In accordance with the operation of the mechanism to supply and extend the various strands of twine desired to be tied around a bale, it will be seen from FIG. 1, that a twine container 54 is supported appropriately adjacent one side of the case 10 for purposes of supporting a conventional ball of baling twine. Such a ball contains many hundreds of feet of twine which extends through an opening 56 in said container, it being understood that in the desired operation of the baler, at least a pair of strands of twine are tied around each bale. This necessitates the provision of a corresponding pair of needles 16.

Each needle 16 is threaded with a strand of twine 58 which is shown in dotted lines in FIG. 1 extending through a suitable guide 60 on bar 38 and then through another guide 62 formed upon an arcuate guard member 64 which is curved about an axis preferably common with the pintles 42. The guard 64 therefore has a curvature similar to the needle 16 and is mounted in slightly spaced relationship directly below said needle when in the retracted, inoperative position thereof shown in FIG. 1. The guard members 64 therefore protect the needles, which are supported in a cantilever manner by bar 38, when the baler is moving over a field so that no hillocks or otherwise can engage the needle 16 and bend or otherwise injure them.

The outer end of each needle 16 is provided with an eye 66 through which the strand of twine 58 extends after passing through guide 62. Said strand 58 then extends around the forward end of the bale 12 being formed, as shown immediately adjacent the right hand end of the illustrated portion of case 10 in FIG. 1, and then along the upper surface of the bale which is being formed in case 10 and terminates adjacent the knotter and clamping units 26 and 28. The terminal end of said strand is clamped between coacting clamping members 68 and 70 if the clamping unit 28.

The twine 58 freely feeds from the container 54 as the bale 12 progressively is formed and, as controlled by the operation of the star wheel 72, when a bale of desired size has been compressed by the plunger P and moved longitudinally through the case 10, control means comprising arms 74 actuate one revolution clutching mechanism of well known type in balers of this type, details thereof therefore not being illustrated or described herein, which causes drive shaft 24 to make a complete revolution and then stop automatically.

Figure 2:
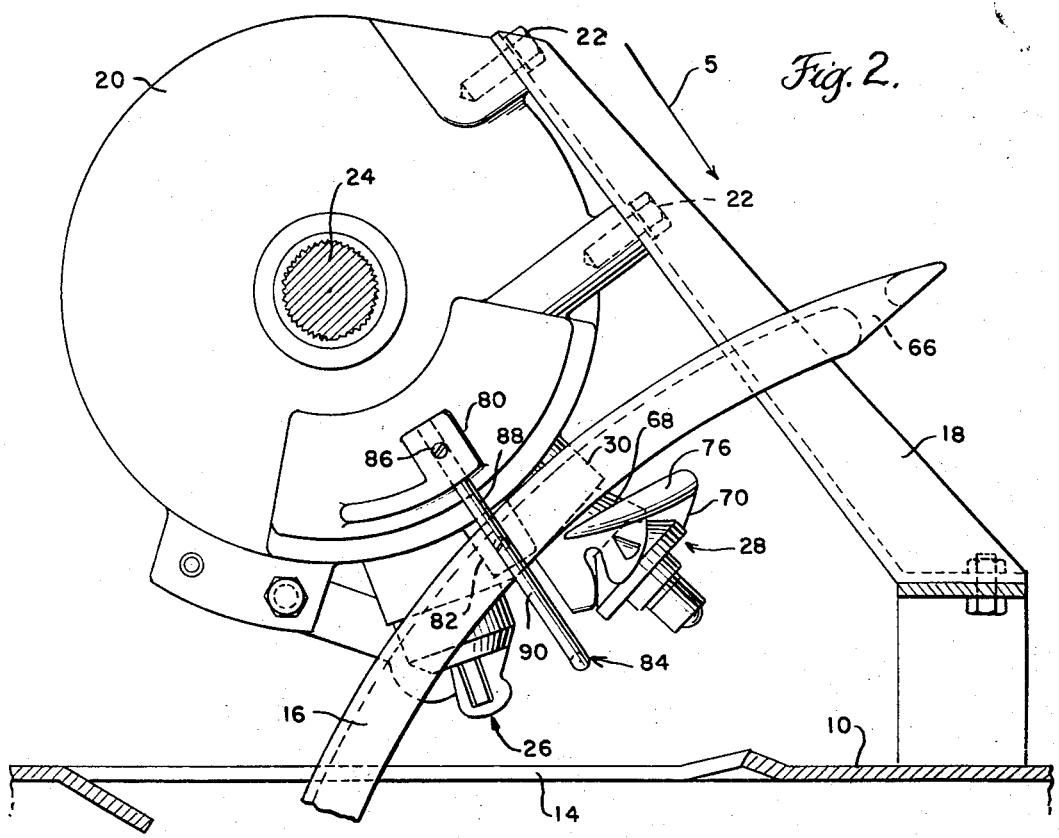
FIG. 2 is an enlarged, fragmentary side elevation of the knotter assembly and a fragmentarily illustrated portion of the outer end of an arcuate needle advanced to its fullest extent incident to cooperating with the knotter assembly.

When the revolution of drive shaft 24 occurs, a number of related coactions throughout the baler occur. Among these are the rotation of the knotter unit 26, the actuation of the clamping unit 28 to cause rotation of the arcuate twine hook 76 which participates in the forming of a knot by the knotter unit 26, and the outer end of each needle 16 is moved upwardly through the slot 14 in the upper wall of case 10, and past the knotter and clamping units 26 and 28 as shown in FIG. 2. Such movement is for purposes of carrying an elongated loop of the twine, the sides of which extend rearwardly from the eye 66 of each needle, into coaction with the knotter and clamping units 26 and 28.

Accurate positioning of such opposite sides of said elongated loop of twine with respect to the knotter and clamping units is essential, within relatively close tolerances, to insure that a satisfactory knot will be tied between one side of said elongated loop and the clamped end of said twine held between the clamping members 68 and 70 of clamping unit 28.

The several needles 16 which usually are provided in a baler of this type move respectively within planes which are parallel to each other and substantially vertical with respect to the terrain over which the baler is moving. To achieve this, the present invention provides guide means having members positioned in transversely spaced relationship with respect to each other, respectively adjacent opposite sides of said planes within which the needles move, and respectively arranged to be slidably engaged by the opposite sides of said needles so as to maintain them reasonably within the desired planes of operation under close tolerance conditions. Attention is now directed to FIGS. 2–5 wherein said guide means is best illustrated.

One of the guide means comprises a machined surface 78 formed along one side of the boss 30 on frame casting 20. The association of this surface with one side of the needle 16 is well illustrated in FIG. 4 and also in the bottom plan view shown in FIG. 5. The knotter frame casting 20 also is provided with a plurality of projections or lugs 80 and 82 which respectively are provided with a pair of parallel holes that receive the opposite end of a somewhat irregularly shaped guide bail 84, formed from metal rod stock, said ends thereof being securely clamped within said holes by suitable means such as set screws 86, one of which is shown in FIG. 2. Such arrangement also enables the operator, such as a farmer, to adjust the guide bail 84 with respect to the movement of the needle 16 and vice versa.

Figure 3:
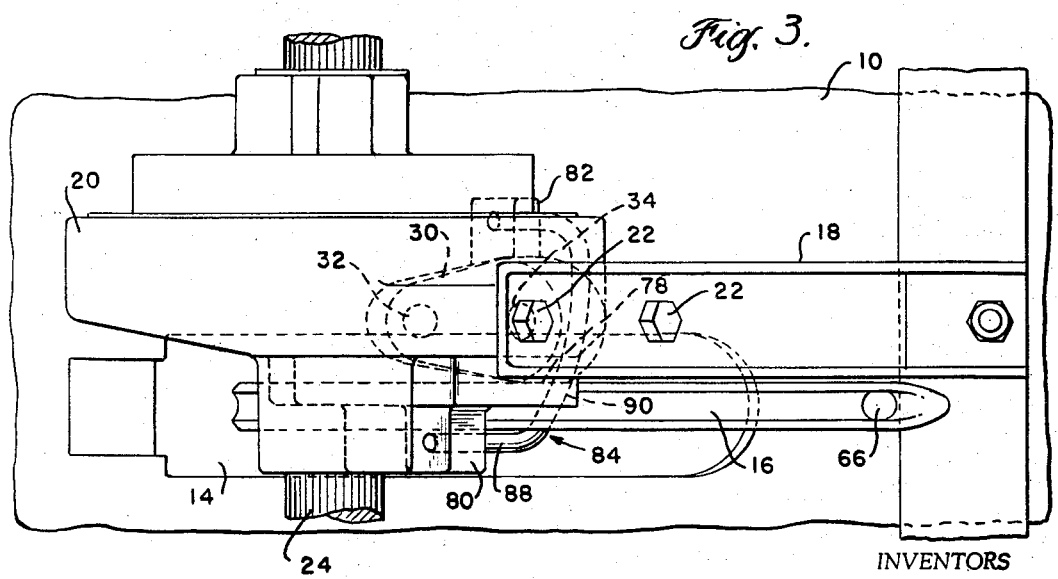
FIG. 3 is a fragmentary plan view of the mechanism shown in FIG. 2.
Figure 4:
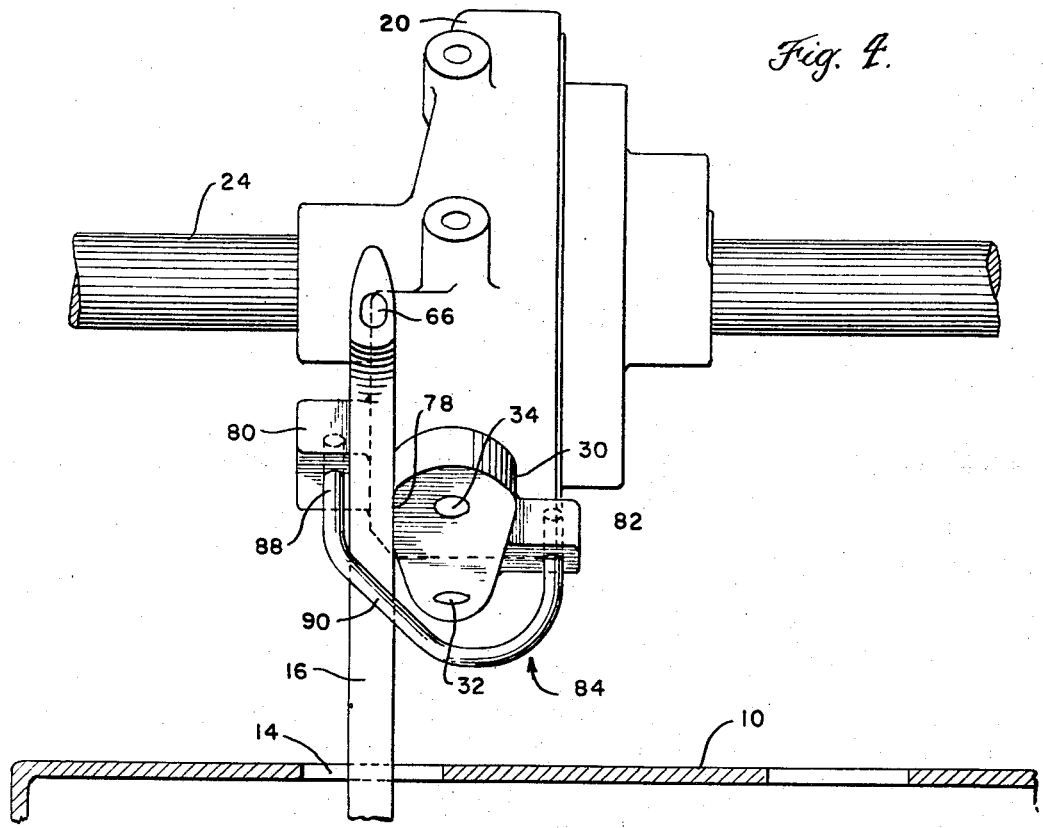
FIG. 4 is a front view of the mechanism shown in FIG. 2 as seen from the right hand side thereof.
Figure 5:
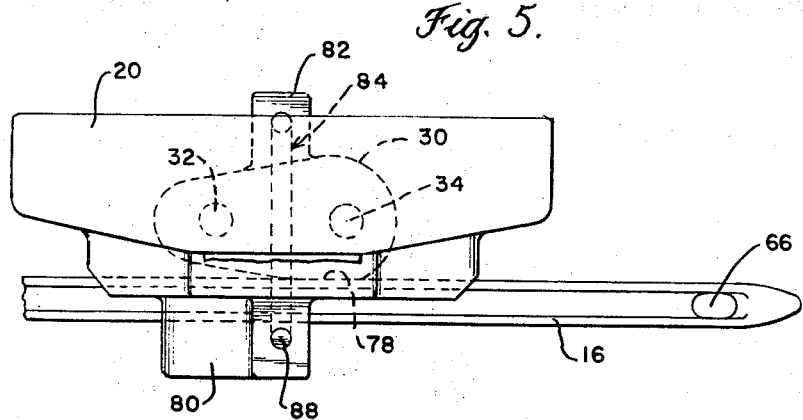
FIG. 5 is a fragmentary plan view of the mechanism shown in FIG. 2 generally as seen when looking in the direction of the arrow shown near the upper right hand corner of said figure.

From FIGS. 3–5 in particular, it will be seen that the leg 88 is spaced laterally from the machined guide surface 78 of boss 30 a distance only slightly greater than the width of the needle 16 as can be observed especially in said figures, thus providing quite precise positioning of the outer end of the needles 16 relative to the respective knotter and clamping units 26 and 28 with which the needles coact to effect tying of a knot in the strands of twine which extend around a completed bale.

In practice, when a baler is being conditioned for operation, it is possible to loosen the base end 36 of each needle with respect to the supporting bar 38 therefor when the needle has been moved, by hand operation of the machine, for example, through a partial or complete cycle, to the fully projected position thereof shown in FIG. 2, for example, whereby the opposite sides of the outer end of the needle 16 may be positioned as desired between the guide means 78 and 88. Following this, the base end 36 of the needle is securely locked in operative position, by appropriate bolts or the like, not shown, with respect to the supporting and operating bar 38.

From the foregoing, therefore, it will be seen that the guide means 78 and 88 provide highly effective means for insuring accurate positioning of the outer ends of the needles 16 with respect to the knotter and clamping units with which each needle coacts but, in particular, the elongated loop of twine carried by the eye 66 of the outer end of each needle is insured of desired positioning thereof with respect to said knotter and clamping units 26 and 28.

The guide bail 84, in addition to providing the guide leg 88 for slidable engagement by the outer end of needle 16 when moving to fully extended position, also serves in a further capacity by providing a short, relatively straight twine guiding section 90, as shown in FIG. 4, which operates to positively guide one side of the elongated loop of twine, which extends rearwardly from the eye 66 in the end of the needle 16, laterally into position to extend between the complementary surfaces of the coacting clamping members 68 and 70 of clamping unit 28 during the cycle of operation of the same with respect to the knotter unit 26 and the rotation of the twine hook 76.

From the foregoing, it will be seen therefore that the present invention provides precisely adjustable and highly effective, yet simple and inexpensive, guide means for the outer ends of twine needles in a baler when the same are moved to fully extended position to dispose the elongated loop of twine carried thereby in operative position with respect to the knotter and clamping means 26 and 28 of the bale so as to insure the formation of an effective knot between the twine strand comprising one side of said elongated loop of twine and the clamped outer end of the strand of twine each time the knotter mechanism of the baler functions. Suitable adjustment of the needle with respect to the guide means, and vice versa, is readily effected by the simplest kind of tools and without extensive knowledge or mechanical skill of any kind. Further, the guide means is capable of long life as well as reliable and foolproof operation.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Twine knotter mechanism for a baler comprising means on a bale case to support a knotter unit and clamping unit in close operative positions, said clamping unit being arranged to clamp the leading end of a strand of twine to be tied around a bale, an arcuate needle supported at one end for swinging movement of the outer end thereof from a retracted to an extended operative position adjacent said knotter and clamping units and having an eye in said outer end through which twine is threaded from a supply thereof to form an elongated loop thereof and carry one side of said loop into engagement with said knotter unit for formation of a knot to tie said one side of said loop to said clamped leading end of said strand, and means to actuate said knotter and clamping units in timed sequence and also project said outer end of said needle to said operative position thereof, in combination with guide means fixed relative to the final portion of the path of movement of the outer end of said needle and positioned relative thereto for interengagement by opposed longitudinal surfaces of said needle to guide the same accurately into operative position relative to said knotter unit when projected to said operative position.

2. The twine knotter mechanism according to claim 1 in which said needle is supported for movement in a substantially vertical plane and said guide means comprise transversely spaced portions positioned for interengagement by the opposite sides of said needle to position the same accurately within said vertical plane which is adjacent said knotter unit.

3. The twine knotter mechanism according to claim 1 in which said guide means comprises a bail member having a portion engageable by one side of said needle during the movement thereof.

4. The twine knotter mechanism according to claim 1 further including support means fixed relative to said baler case and supporting said knotter and clamping units, said support means having a projection provided with a finished side surface comprising part of said guide means and positioned for engagement by one side of said needle, said guide means also including additional guide means engageable by the other side of said needle during operative movement thereof.

5. The twine knotter mechanism according to claim 4 in which said additional guide means comprises a portion of a bail member fixed relative to said support means.

6. The twine knotter mechanism according to claim 5 in which said bail member has a guide surface engageable by said one side of said elongated loop of twine during movement of said needle with respect to said guide means, said guide surface being shaped to guide said side of said elongated loop of twine into engagement with said knotter unit when said needle has moved to said operative position thereof.

7. The twine knotter mechanism according to claim 6 in which said guide surface of said bail member extends downward and inward from one leg of said bail member which comprises guide means for one side of said needle.

References Cited

UNITED STATES PATENTS

| | | | |
|---|---|---|---|
| 615,815 | 12/1898 | Dennis | 289—13 |
| 1,155,860 | 10/1915 | Witte | 289—13 |
| 3,101,963 | 8/1963 | Sullivan et al. | 289—2 X |
| 3,243,214 | 3/1966 | Keates | 289—2 |

LOUIS K. RIMRODT, *Primary Examiner.*

U.S. Cl. X.R.

289—13